United States Patent
Falkenhahn et al.

(10) Patent No.: US 11,561,560 B2
(45) Date of Patent: Jan. 24, 2023

(54) FLOW CONTROLLER, VALVE ARRANGEMENT AND METHOD

(71) Applicant: Festo SE & Co. KG, Esslingen (DE)

(72) Inventors: Valentin Falkenhahn, Stuttgart (DE); Gerhard Gommel, Notzingen (DE); Daniel Klassen, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/409,061

(22) Filed: Aug. 23, 2021

(65) Prior Publication Data

US 2022/0066480 A1 Mar. 3, 2022

(30) Foreign Application Priority Data

Aug. 26, 2020 (DE) .......................... 102020210777.7

(51) Int. Cl.
*G05D 7/06* (2006.01)
*F16K 37/00* (2006.01)

(52) U.S. Cl.
CPC .......... *G05D 7/0623* (2013.01); *G05D 7/0647* (2013.01); *F16K 37/0091* (2013.01); *Y10T 137/7761* (2015.04)

(58) Field of Classification Search
CPC ................ G05D 7/0623; G05D 7/0647; Y10T 137/7761; F16K 37/0091; F16K 31/02
USPC ...................................................... 137/487.5
See application file for complete search history.

(56) References Cited

U.S. PATENT DOCUMENTS

| | | | | |
|---|---|---|---|---|
| 9,081,388 B2* | 7/2015 | Tanaka | ............... | G05D 7/0635 |
| 9,557,744 B2* | 1/2017 | Ding | .................... | G05D 7/0635 |
| 10,031,005 B2* | 7/2018 | Ding | .................... | G01F 15/046 |
| 11,105,664 B2* | 8/2021 | Miller | ....................... | G01F 1/34 |
| 2005/0182524 A1* | 8/2005 | Brodeur | .................. | G01F 1/363 |
| | | | | 700/282 |
| 2005/0189018 A1* | 9/2005 | Brodeur | ............... | G05D 7/0635 |
| | | | | 137/487.5 |
| 2008/0009978 A1* | 1/2008 | Smirnov | ............. | G05D 7/0635 |
| | | | | 700/282 |
| 2010/0080262 A1* | 4/2010 | McDonald | ................ | G01F 5/00 |
| | | | | 374/166 |
| 2013/0186486 A1* | 7/2013 | Ding | .................... | G05D 7/0635 |
| | | | | 137/487 |

(Continued)

FOREIGN PATENT DOCUMENTS

EP 3105647 B1 1/2019
JP 4137666 B2 8/2008

*Primary Examiner* — William M McCalister
(74) *Attorney, Agent, or Firm* — Hoffmann & Baron, LLP

(57) ABSTRACT

A flow controller includes a valve unit for influencing the flow of a fluid through a fluid channel, a flow sensor for detecting the flow of the fluid through the fluid channel, a pressure sensor arrangement for detecting a fluid pressure of the fluid, and a control unit which is adapted to, in response to the flow being within a measurement range of the flow sensor, assume a first operating mode, and, in the first operating mode, to perform a first closed-loop flow control on the basis of the flow detected by the flow sensor, and, in response to the flow being outside the measurement range of the flow sensor, assume a second operating mode, and, in the second operating mode, to perform an open-loop flow control on the basis of the detected fluid pressure and/or to perform a second closed-loop flow control on the basis of the detected fluid pressure.

19 Claims, 3 Drawing Sheets

(56) References Cited

U.S. PATENT DOCUMENTS

2016/0111257 A1* 4/2016 Kellogg .................... F17D 3/01
  137/594

\* cited by examiner

FLOW CONTROLLER, VALVE ARRANGEMENT AND METHOD

BACKGROUND OF THE INVENTION

The invention relates to a flow controller comprising a valve unit for influencing the flow of a fluid through a fluid channel, a flow sensor for detecting the flow of the fluid through the fluid channel, a pressure sensor arrangement for detecting a fluid pressure of the fluid, and a control unit adapted to adopt a first operating mode in response to the flow being within a measurement range of the flow sensor and to perform closed-loop flow control in the first operating mode based on the flow detected by the flow sensor. The flow controller is in particular a closed-loop flow controller. The flow may also be referred to as flow rate.

SUMMARY OF THE INVENTION

It is an object of the invention to provide a flow controller that can be used flexibly.

The object is solved by a flow controller according to claim 1. The control unit of the flow controller is adapted to adopt, in response to the flow being outside the measurement range of the flow sensor, a second operating mode, and, in the second operating mode, perform open-loop flow control based on the detected fluid pressure and/or to perform second closed-loop flow control based on the detected fluid pressure.

By providing the second operating mode, the flow controller can provide, in particular open-loop control and/or closed-loop control, a flow of the fluid that is outside the measurement range. This allows the flow controller to be used flexibly.

The invention further relates to a valve arrangement comprising the flow controller, a carrier section, and a plurality of valve modules disposed on the carrier section, wherein one of the valve modules comprises the valve unit.

The invention further relates to a method of operating the flow controller or the valve arrangement, comprising the steps of: in response to the flow being within the measurement range of the flow sensor, entering the first operating mode and performing the first closed-loop flow control based on the flow detected by the flow sensor in the first operating mode, and in response to the flow being outside the measurement range of the flow sensor, entering the second operating mode and performing the open-loop flow control and/or the second closed-loop flow control based on the detected fluid pressure in the second operating mode.

BRIEF DESCRIPTION OF THE DRAWINGS

Further exemplary details as well as exemplary embodiments are explained below with reference to the figures. Thereby shows FIG. 1 a schematic representation of a flow controller, FIG. 2A a schematic representation of a valve arrangement according to a first variant, FIG. 2B a schematic representation of a valve arrangement according to a second variant, and FIG. 3 a graph showing a time course of a recorded flow and a calculated flow.

DETAILED DESCRIPTION

Figure 1:
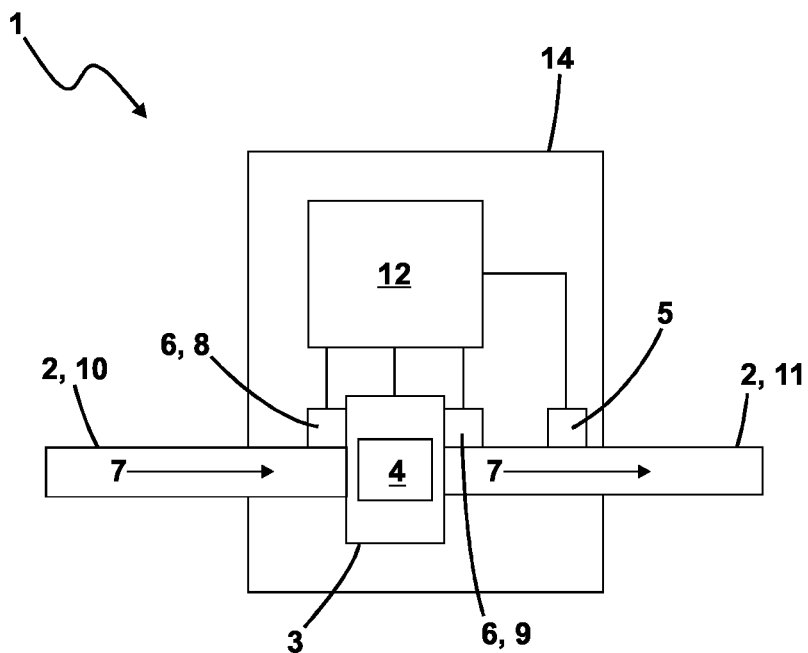

FIG. 1 shows a flow controller 1 which is used to closed-loop control a flow of a fluid through a fluid channel 2. The flow controller 1 is designed in particular for use in industrial automation, for example for process automation and/or factory automation. In particular, the flow controller 1 is an industrial flow controller. The fluid is preferably a pressurized fluid, in particular compressed air. The flow controller 1 is in particular a pneumatic flow controller.

The flow controller 1 comprises a valve unit 3 for influencing the flow of the fluid through the fluid channel 2. The valve unit 3 is, for example, a proportional valve. Expediently, the valve unit 3 is controllable by means of a PWM signal. PWM stands for pulse width modulation. The valve unit 3 comprises a valve member 4 which influences the flow of the fluid through the fluid channel. The valve unit 3 can, for example, have one or two pilot valves, in particular piezo pilot valves, via which the position of the valve member 4 is adjustable.

The flow controller 1 further comprises a flow sensor 5 for detecting the flow of the fluid through the fluid channel 2. The flow detected by the flow sensor 5 may also be referred to as the measured flow or as flow measurement signal 24. In particular, the flow sensor 5 is based on a different measuring principle and/or physical principle than the pressure sensor arrangement 6 and/or its pressure sensors explained below. In particular, the flow sensor 5 detects a different measured variable, in particular a measured variable with a different physical unit, than the pressure sensor arrangement 6 and/or its pressure sensors. Preferably, the flow sensor 5 does not comprise a pressure sensor. The flow sensor 5 is designed, for example, as a thermal flow sensor. The flow sensor may, for example, comprise a heating element for heating the fluid and/or a temperature sensor for detecting the temperature of the fluid. The flow sensor 5 provides the flow measurement signal 24 that represents the flow of the fluid through the fluid channel 2. In particular, the flow sensor 5 is designed to detect, in particular to measure, as the flow, the mass flow and/or volume flow of the fluid through the fluid channel 2. The flow is thus in particular a mass flow and/or volume flow. The flow may also be referred to as flow rate.

The flow controller 1 further comprises a pressure sensor arrangement 6 for detecting a fluid pressure of the fluid. Exemplarily, the pressure sensor arrangement 6 comprises a first pressure sensor 8 for detecting a first fluid pressure, the first pressure sensor 8 being arranged upstream of the valve unit 3 in the flow direction 7. Exemplarily, the pressure sensor arrangement 6 comprises a second pressure sensor 9 for detecting a second fluid pressure, the second pressure sensor 9 being arranged downstream of the valve unit 3 in the flow direction 7 of the flow. The fluid channel 2 is divided by the valve unit 3 into two channel sections 10, 11—a first channel section 10 and a second channel section 11. In order to pass from the first channel section 10 to the second channel section 11, the fluid must flow through the valve unit 3. The first channel section 10 is arranged on a first side of the valve unit 3 and the second channel section 11 is arranged on a second side of the valve unit 3 different from the first side. Exemplarily, the first pressure sensor 8 is arranged in or at the first channel section 10 and/or the second pressure sensor 9 is arranged in or at the second channel section 11.

The flow controller 1 further comprises a control unit 12, which is designed in particular as a microcontroller. The control unit 12 is adapted to communicate with the valve unit 3, the flow sensor 5 and/or the pressure sensor arrangement 6. The control unit 12 is adapted to perform the closed-loop control of the flow of the fluid through the fluid channel 2. This control shall be referred to as closed-loop flow control. In particular, the control unit 12 has a control algorithm for performing this closed-loop control. The control unit 12 is preferably adapted to provide, for example calculate, and/or receive a flow setpoint, for example from a higher-level controller, in particular from a programmable logic controller, PLC. The control unit 12 is configured to detect an actual flow value as a feedback variable. The actual flow value is in particular the flow detected by the flow sensor 5. The control unit 12 is adapted to compare the actual flow value with the flow setpoint value and, on the basis of the comparison, to provide a control signal for controlling the valve unit 3, in particular in order to set the position of the valve member 4. The control unit 12 provides the control signal in such a way that, by the position of the valve member 4 effected thereby, the flow, in particular the actual flow value, is changed towards the flow setpoint value.

The flow controller 1 can, for example, be designed as a valve device, in particular as a single valve. In particular, the flow controller 1 can have an outer housing 14, in which the valve unit 3 and the control unit 12 are preferably arranged. Optionally, the pressure sensor arrangement 6, for example the first pressure sensor 8 and/or the second pressure sensor 9, may be arranged in the outer housing 14. Alternatively, the pressure sensor arrangement 6, for example the first pressure sensor 8 and/or the second pressure sensor 9, may be arranged outside the outer housing 14. Optionally, the flow sensor 5 may be arranged in the outer housing 14. Alternatively, the flow sensor 5 may be arranged outside the outer housing 14.

According to a possible embodiment, a system comprising the flow controller 1 and a fluidic actuator, for example a drive cylinder, is provided, wherein the fluidic actuator is connected to the second channel section 11 and the control unit 12 is adapted to control the flow of fluid through the fluid channel 2 to and/or from the fluidic actuator.

Figure 2A:
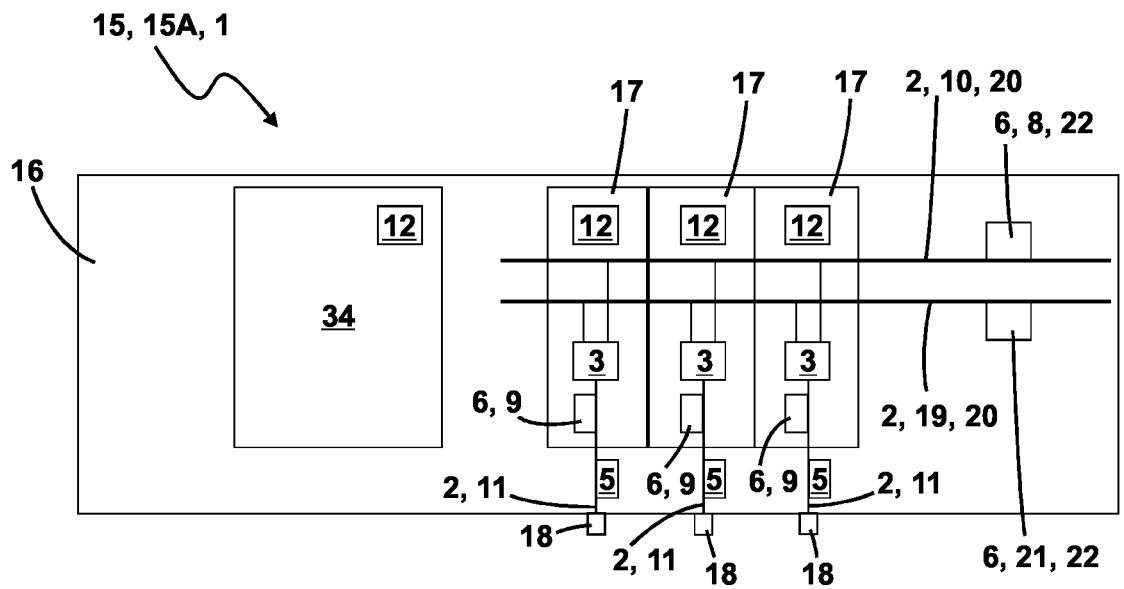

FIG. 2A shows a valve arrangement 15 according to a first variant, which valve arrangement 15 can also be referred to as first valve arrangement 15A. The valve arrangement 15 comprises the flow controller 1. The valve arrangement 15 is designed in particular as a valve terminal. The valve arrangement 15 comprises a carrier section 16, which is designed, for example, as a carrier plate or as a carrier housing. Exemplarily, the carrier section 16 comprises a mounting side for mounting valve modules 17. The mounting side is preferably the upper side of the carrier section 16. The carrier section 16 further comprises a plurality of fluidic ports 18, which are designed in particular as hose ports. The fluidic ports 18 are expediently arranged on a port side of the carrier section, which is preferably aligned perpendicular to the mounting side and represents, for example, the front side of the carrier section 16.

The fluidic ports 18 are used, for example, to connect a fluidic actuator, for example a drive cylinder. According to a possible embodiment, a system comprising the valve arrangement 15 and a fluidic actuator, for example a drive cylinder, is provided, wherein the fluidic actuator is connected to at least one fluidic port 18 and the control unit 12 is adapted to control the flow of fluid through the fluidic port 18 to and/or from the fluidic actuator.

The fluid channel 2 comprises a channel section 20 arranged in the carrier section 16, via which channel section 20 the fluid flows from and/or to the valve modules 17. Exemplarily, the channel section 20 comprises the first channel section 10. The first channel section 10 is, for example, a supply channel extending through the carrier section 16 and fluidically connects one, plural, or all of the valve units 3 to a fluid source. The carrier section 16 further comprises a plurality of second channel sections 11, each fluidically connecting a respective valve unit 3 to a respective fluidic port 18. The carrier section 16, in particular the channel section 20, exemplarily comprises a third channel section 19, which fluidically connects one, plural or all valve units 3 with a fluid sink, in particular the surroundings of the valve arrangement 15.

The valve arrangement 15 further comprises a plurality of valve modules 17 arranged on the carrier section 16. Exemplarily, the valve modules 17 are arranged on the mounting side of the carrier section 16. In particular, the valve modules 17 are arranged side by side, and preferably in a line-up direction which, by way of example, corresponds to the longitudinal direction of the carrier section. The valve modules are preferably plate-shaped and/or cuboid-shaped. The valve modules 17 together form a cuboid valve module block.

Preferably, one of the valve modules 17 comprises the valve unit 3, which is in particular designed as explained above. In particular, several or all of the valve modules 17 comprise a respective valve unit 3. The explanations relating to a valve unit 3 preferably apply to several or to all of the valve units 3. The valve unit 3 can in particular comprise four valves connected to form a full bridge, each of which valves can be actuated by two respective piezo pilot valves, for example. The valve unit 3 is preferably designed to selectively connect or block a respective second channel section 11 to the first channel section 10 or the third channel section 19. The valve unit 3 is configured to influence the flow of the fluid from the first channel section 10 to the respective second channel section 11 and/or to influence the flow of the fluid from the respective second channel section 11 to the third channel section 19.

The valve arrangement 15 comprises the pressure sensor arrangement 6, in particular the first pressure sensor 8 and/or the second pressure sensor 9. The first pressure sensor 8 of the pressure sensor arrangement 6 is exemplarily arranged in the carrier section 16. Alternatively, one, several or all valve modules 17 may comprise a respective first pressure sensor 8. Preferably, one, several or all valve modules 17 comprise a respective second pressure sensor 9 of the pressure sensor arrangement 6. Alternatively, the carrier section 16 may comprise the second pressure sensor 9 (or a plurality of second pressure sensors 9). Exemplarily, the pressure sensor arrangement 6 comprises a third pressure sensor 21, which is preferably arranged in the carrier section 16 and serves in particular to detect the fluid pressure in the third channel section 19. The pressure sensors 8, 21 of the carrier section 16 may each also be referred to as a carrier section pressure sensor 22. The control unit 12 detects the fluid pressure with the carrier section pressure sensor 22.

The valve arrangement 15 further comprises the flow sensor 5. Exemplarily, the valve arrangement 15 comprises a plurality of flow sensors 5, wherein each flow sensor is assigned to a respective valve unit 3 and serves to detect, in particular to measure, the flow of the fluid occurring through the respective valve unit 3. Exemplarily, one, several or all flow sensors 5 are arranged in the carrier section 16. Alternatively, one, several or all flow sensors may be arranged at a different location, for example in a valve module 17, outside the carrier section 16, at the fluidic port 18 and/or at an external fluid line connected to the fluidic port 18.

Exemplarily, the valve arrangement 15 comprises a control module 34, which is expediently arranged on the carrier section 16, in particular next to the valve modules 17. The control module 34 comprises the control unit 12.

Expediently, the valve unit 3, the control unit 12, the flow sensor 5 and the pressure sensor arrangement 6 together form the flow controller 1 of the valve arrangement 15.

Figure 2B:
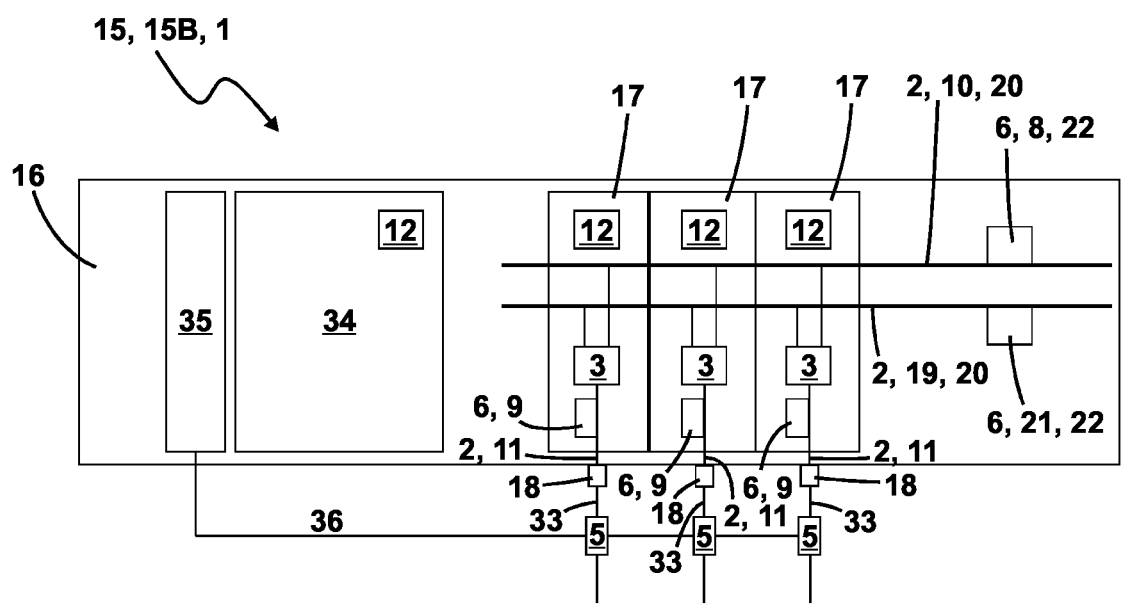

FIG. 2B shows a valve arrangement 15 according to a second variant, which valve arrangement 15 may also be referred to as second valve arrangement 15B. The explanations relating to the valve arrangement 15, in particular the first valve arrangement 15A, apply expediently also to the second valve arrangement 15B.

Preferably, in the second valve arrangement 15B, the flow sensors 5 are arranged outside the carrier section 16. Exemplarily, each flow sensor 5 is connected to a respective fluidic port 18 via a respective external fluid line 33. Alternatively, each flow sensor 5 may be connected to a respective fluidic port 18, in particular directly. In particular, the flow sensors 5 are designed as external flow sensors. For example, the flow sensors 5 are designed as flow sensor modules. Each flow sensor 5 is expediently fluidically connected between a respective fluidic port 18 and a fluidic actuator to be supplied with pressurized fluid via this port 18.

The valve arrangement 15 expediently further comprises an input module 35 to which each flow sensor 5 is connected, exemplarily via a communication line 36 which runs in particular outside the carrier section 16. The input module 35 is expediently arranged on the carrier section 16, in particular next to the control module 34. Alternatively, the flow sensors 5 may be connected directly to the control module 34.

Figure 3:
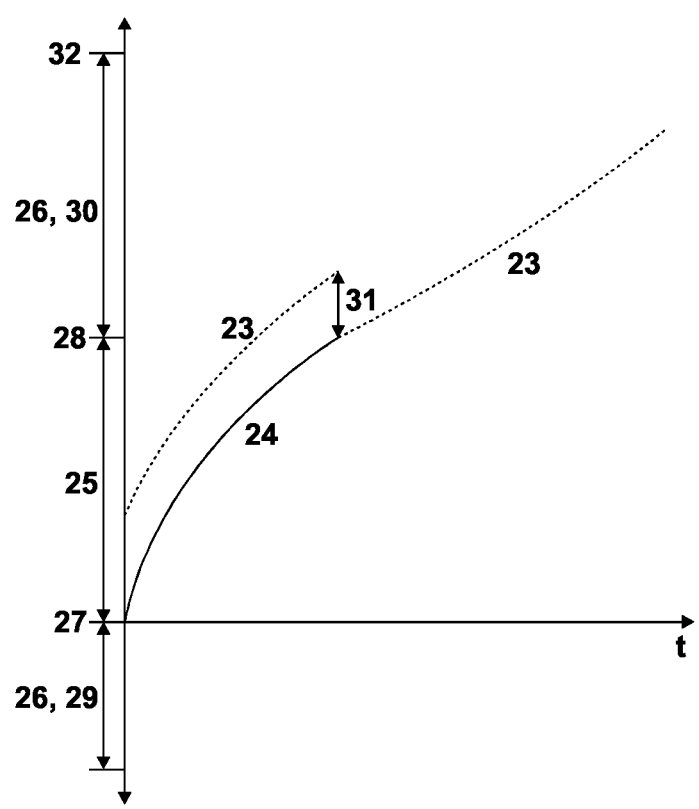

FIG. 3 shows a graph with a flow calculation signal 23 (shown as a dashed line) and a flow measurement signal 24 (shown as a solid line). Time is plotted on the horizontal axis and flow is plotted on the vertical axis, for example as mass flow or volume flow.

FIG. 3 further shows a measurement range 25 of the flow sensor 5 and a calculation range 26, which lies outside the measurement range 25. Exemplarily, the measurement range 25 lies between a lower limit value 27 and an upper limit value 28. Below the measurement range 25, in particular below the lower limit value 27, lies the calculation range 26, in particular a first calculation range 29. Above the measurement range 25, in particular above the upper limit value 28, lies the calculation range 26, in particular a second calculation range 30.

The flow measurement signal 24 is the time course of the flow detected with the flow sensor 5. The measurement of the flow with the flow sensor is only possible and/or reliable within the measurement range 25. For example, the flow sensor 5 goes into saturation outside the measurement range 25—i.e. above the upper limit value 28 and/or below the lower limit value 27.

The control unit 12 is configured to assume a first operating mode in response to the flow being within the measurement range 25 of the flow sensor 5. In the first operating mode, the control unit 12 performs a first closed-loop flow control based on the flow detected by the flow sensor 5. The first closed-loop flow control corresponds to the closed-loop flow control explained above, wherein the control unit 12 uses the flow detected by the flow sensor 5—i.e. in particular the flow measurement signal 24—as the actual flow value. In the first operating mode, the control unit 12 is thus designed to compare the flow detected by the flow sensor 5, in particular the flow measurement signal 24, with the flow setpoint value and, on the basis of the comparison, to provide a control signal for controlling the valve unit 3, in particular in order to set the position of the valve member 4. The control unit 12 provides the control signal in such a way that, by the position of the valve member 4 effected thereby, the detected flow, in particular the flow measurement signal 24, is changed towards the flow setpoint value.

The control unit 12 is further adapted to adopt a second operating mode in response to the flow being outside the measurement range 25 of the flow sensor 5. In the second operating mode, the control unit 12 performs open-loop flow control based on the fluid pressure sensed by the pressure sensor arrangement 6 and/or performs closed-loop flow control based on the fluid pressure sensed by the pressure sensor arrangement 6.

In particular, the control unit 12 is configured to perform open-loop flow control based on the first fluid pressure and the second fluid pressure or to perform closed-loop flow control based on the first fluid pressure and the second fluid pressure in the second operating mode.

Preferably, in the second operating mode, the control unit 12 performs the open-loop flow control and/or the second closed-loop flow control on the basis of two fluid pressures detected with the pressure sensor arrangement 6 and a conductance of the valve unit 3, which in particular depends on the degree of opening of the valve member 4. In particular, the control unit 12 calculates a flow, in particular the flow calculation signal 23, for example a mass flow, on the basis of two fluid pressures detected with the pressure sensor arrangement 6 and the conductance value, and performs the open-loop flow control and/or the second closed-loop flow control on the basis of the calculated flow.

In particular, the control unit 12 calculates the flow calculation signal 23 as $p1*D*L*DF$, that is, as a product of $p1$, $D$, $L$, and $DF$, where $p1$ is an absolute primary pressure before a pressure drop, $D$ is the density of the fluid, $L$ is the conductance, and $DF$ is a dimensionless flow function that depends on the pressure ratio of a secondary pressure after the pressure drop to the primary pressure before the pressure drop. The primary pressure and the secondary pressure are sensed by the pressure sensor arrangement 6. For example, the primary pressure $p1$ is the first fluid pressure sensed with the first pressure sensor 8 and the secondary pressure is the second fluid pressure sensed with the second pressure sensor 9, especially in the case where the fluid flows from the first channel section 10 to the second channel section 11. Further, the primary pressure $p1$ may be the second fluid pressure sensed with the second pressure sensor 9 and the secondary pressure may be the third fluid pressure sensed with the third pressure sensor 21, particularly in the case where the fluid flows from the second channel section 11 to the third channel section 19.

Further, the detected fluid pressure may be a differential pressure measured in particular with the first pressure sensor 8 and the second pressure sensor 9, for example, when the fluid flows from the first channel section 10 into the second channel section 11. Further, the sensed fluid pressure may be a differential pressure measured with the second pressure sensor 9 and the third pressure sensor 21, for example, when the fluid flows from the second channel section 11 into the third channel section 19.

Preferably, the control unit 12 is configured to calculate the flow, in particular the flow calculation signal 23, in the second operating mode on the basis of the detected fluid pressure and to perform the second closed-loop flow control or the open-loop flow control on the basis of the calculated flow, in particular the flow calculation signal 23. For example, the control unit 12 is configured to perform the open-loop flow control in the second operating mode taking into account a flow characteristic of the valve unit 3, or to perform the second closed-loop flow control taking into account the flow characteristic of the valve unit 3. The flow characteristic is, for example, a housing characteristic. Preferably, the flow characteristic is a conductance, in particular of the valve unit 3 and/or of the fluid channel 2. The control unit 12 is configured, for example, to detect a degree of opening of the valve member 4 and to determine the flow characteristic, in particular the conductance, on the basis of the degree of opening. Expediently, the valve unit 3 comprises a position sensor for detecting the degree of opening of the valve member 4.

In particular, the control unit 12 is configured to calculate in the second operating mode the flow, in particular the flow calculation signal 23, based on the fluid pressure and the flow characteristic, in particular the conductance. For example, in the second operating mode, the control unit 12 calculates the flow calculation signal 23 based on two fluid pressures and the flow characteristic, wherein the two fluid pressures comprise a first fluid pressure (upstream of the valve unit 3) and a second fluid pressure (downstream of the valve unit 3). For example, the control unit forms the ratio from the two fluid pressures and calculates the flow calculation signal 23 therefrom.

The control unit 12 is designed to perform, in the second operating mode, the second closed-loop flow control on the basis of the calculated flow, in particular the flow calculation signal 23. The second closed-loop flow control corresponds to the closed-loop flow control explained above, wherein the control unit 12 uses the flow calculated on the basis of the fluid pressure—i.e. in particular the flow calculation signal 23—as the actual flow value. In the second operating mode, the control unit 12 is thus designed to compare the flow calculated on the basis of the fluid pressure, in particular the flow calculation signal 23, with the flow setpoint value and, on the basis of the comparison, to provide a control signal for controlling the valve unit 3, in particular in order to set the position of the valve member 4. The control unit 12 provides the control signal in such a way that, by the position of the valve member 4 effected thereby, the calculated flow, in particular the flow calculation signal 23, is changed towards the flow setpoint value.

Preferably, the control unit 12 is configured, in the second operating mode, to perform the open-loop flow control not on the basis of the flow detected by the flow sensor 5, in particular not on the basis of the flow measurement signal 24, and/or to perform the second closed-loop flow control not on the basis of the flow detected by the flow sensor 5, in particular not on the basis of the flow measurement signal. Preferably, the control unit 12 does not take the flow measurement signal 24 into account during the second closed-loop flow control. In particular, in the second closed-loop flow control, the actual flow value is not the flow measurement signal 24 and/or is not based on the flow measurement signal 24. Optionally, the control unit 12 may be configured not to detect a flow with the flow sensor 5 in the second operating mode.

The second closed-loop flow control may be referred to as coarse closed-loop flow control and/or the first closed-loop flow control may be referred to as fine closed-loop flow control. In the first closed-loop flow control, the error—i.e. in particular the difference between the flow setpoint and the actual flow—is preferably smaller than in the second closed-loop flow control.

In particular, the control unit 12 is designed to switch from the first operating mode to the second operating mode in response to the flow being outside the measurement range 25—for example, when the flow reaches and/or exceeds the upper limit value 28 or the lower limit value 27. The control unit 12 is further adapted to switch from the second operating mode to the first operating mode in response to the flow being within the measurement range 25.

The measurement range 25 is expediently stored in the control unit 12. In particular, the upper limit value 28 and/or the lower limit value 27 is stored in the control unit 12. The control unit 12 is preferably designed to compare the flow detected by means of the flow sensor 5, i.e. in particular the flow measurement signal 24—with the measurement range 25, in particular the upper limit value 28 and/or the lower limit value 27, and to selectively adopt the first operating mode or the second operating mode on the basis of the comparison. Alternatively or additionally, the control unit 12 can be designed to adopt the second operating mode on the basis of a signal characteristic of the flow measurement signal 24, in particular a saturation signal characteristic.

Preferably, the lower limit value 27 and/or the upper limit value 28 can be set, in particular parameterized, in the control unit 12. In particular, if the flow sensor 5 is an external flow sensor and there are, for example, (application-specific) different types of usable flow sensors, the measurement range 25 can be set by parameterizable limits 27, 28.

Preferably, the control unit 12 is configured to provide a continuous transition between the first closed loop flow control in the first operating mode and the second closed-loop flow control and/or open-loop flow control in the second operating mode. In particular, a continuous transition means that there is no jump in the actual flow of the fluid. For example, the control unit 12 achieves the continuous transition by the control unit 12 changing the control signal only continuously and/or only within predetermined limits during the transition. For example, the control unit 12 is configured to limit the maximum change in the control signal when switching between the first operating mode and the second operating mode.

The control unit 12 may be configured to provide the continuous transition between the first closed-loop flow control and the second closed-loop flow control by the control unit 12 providing a continuous transition between the sensed flow, in particular the flow measurement signal 24 and the calculated flow, in particular the flow calculation signal 23. In particular, the control unit 12 is adapted to calculate, during the transition from the first operating mode to the second operating mode, the calculated flow taking into account the detected flow, so that the transition from the detected flow and the calculated flow is continuous.

For example, the control unit 12 is configured to provide in the transition range from the measurement range 25 to the calculation range 26 a transition characteristic by means of a transition algorithm, in which transition characteristic the error, expediently the error of the calculated flow, in particular of the flow calculation signal 23, increases monotonically and preferably corresponds to an accuracy specification for the measurement range 25 when re-entering the measurement range 25. In particular, there is no step-like change of the flow when leaving the measurement range 25. During the first closed-loop flow control in the measurement range 25, the control unit 12 expediently identifies inaccuracies in the flow characteristic (e.g. booster seat sealing offset) and uses these when leaving the measurement range 25—i.e. for a change from the first operating mode to the second operating mode—for a compensation in particular of an error of the calculated flow.

For example, the control unit 12 is configured to calculate the flow, in particular the flow calculation signal 23, in the first operating mode on the basis of the detected fluid pressure and to determine an error 31 of the calculated flow, in particular of the flow calculation signal 23, on the basis of the flow detected by the flow sensor 5, in particular of the flow measurement signal 24. The error 31 is exemplarily the difference between the flow calculation signal 23 and the flow measurement signal 24, in particular in the first operating mode. In particular, the error 31 may relate to the flow characteristic, in particular the conductance. The error 31 is, for example, a booster seat sealing offset. The control unit 12 is preferably configured to take the determined error 31 into account in the second operating mode. In particular, the control unit 12 is configured to calculate the calculated flow, in particular the flow calculation signal 23, in the second operating mode taking into account the determined error 31, in particular in such a way that the determined error 31 is compensated, in particular reduced or eliminated.

Exemplarily, the flow sensor 5 is unidirectional, so that the measurement range 25 comprises only a first flow direction 7 of the fluid. The control unit 12 is expediently configured to assume the second operating mode in response to the fluid flowing in a second flow direction opposite to the first flow direction 7. Exemplarily, the measurement range 25 is limited to the first flow direction 7, for example a positive flow direction, and the first calculation range 29 comprises the second flow direction, in particular a negative flow direction. The control unit 12 is configured to switch from the first operating mode to the second operating mode in response to the flow transitioning from the measurement range 25 to the first calculation range 29.

For example, the flow sensor 5 is unidirectional and comprises a measurement range 25 from the first limit value 27, for example 0 L/min, to the second limit value 28, for example 200 L/min. For example, the valve unit 3 is capable of providing a flow in the first flow direction 7 up to a flow limit value 32, for example 800 L/min. The second calculation range 30 extends from the second limit value 28 up to the flow limit value 32. The control unit 12 is adapted to assume the first operating mode in the measurement range 25 and to assume the second operating mode in the second calculation range 30. Preferably, the control unit 12 is further configured to assume the second operating mode in the first calculation range 29.

According to a further example, the flow sensor 5 is bidirectional and comprises a measurement range 25 from the first limit value 27, for example −200 L/min, to the second limit value 28, for example 200 L/min, wherein the first limit value 27 relates to a different flow direction than the second limit value 28. The control unit 12 is configured to assume the first operating mode in the measurement range 25 and to assume the second operating mode in the second calculation range 30. Preferably, the control unit 12 is further configured to assume the second operating mode in the first calculation range 29.

Preferably, when no flow sensor 5 is present, the control unit 12 is configured to always assume the second operating mode. For example, the control unit 12 is adapted to detect whether a flow sensor 5 is present, for example, whether a flow sensor 5 is connected to the input module 35 and/or the control unit 12. In response to the control unit 12 detecting that no flow sensor 5 is present, the control unit 12 always assumes the second operating mode. In response to the control unit 12 detecting that a flow sensor 5 is present, the control unit 12 adopts the first operating mode when the flow is within the measurement range 25 and the second operating mode when the flow is outside the measurement range 25.

The flow controller 1 and/or the valve arrangement 15 may be operated according to a method comprising the following steps:

At a first step, in response to the flow being within the measurement range 25 of the flow sensor 5, the control unit 12 enters the first operating mode and performs, in the first operating mode, the first closed-loop flow control based on the flow detected by the flow sensor 5. In the first operating mode, the control unit 12 does not perform the second closed-loop flow control and/or the open-loop flow control.

At a second step, in response to the flow being outside the measurement range 25 of the flow sensor 5, the control unit 12 enters the second operating mode and performs, in the second operating mode, the open-loop flow control and/or the second closed-loop flow control based on the detected fluid pressure. In the second operating mode, the control unit 12 does not perform the first closed-loop flow control.

During operation of the valve arrangement 15, for example, a flow of the fluid, in particular compressed air, first takes place from the first channel section 10 via the valve unit 3 to the second channel section 11, in particular to the fluidic port 18. For example, the fluidic port 18 is aerated. The flow is in the measurement range 25, so that the control unit 12 assumes the first operating mode and performs the first closed-loop flow control.

Optionally, the flow is increased so that the flow leaves the measurement range 25. The control unit 12 detects that the flow is outside the measurement range 25, for example by means of the flow sensor 5, switches to the second operating mode and performs the second closed-loop flow control, in particular based on the fluid pressures detected by the first pressure sensor 8 and the second pressure sensor 9 and preferably the degree of opening of the valve member 4.

Optionally, a change in direction of the flow occurs so that the flow leaves the measurement range 25, for example by the fluidic port 18 being de-aerated. The fluid expediently flows from the second channel section 11 via the valve unit 3 to the third channel section 19. In particular, the fluid flows from the fluidic port 18 via the valve unit 3 to the third channel section 19. The control unit 12 detects that the flow is outside the measurement range 25, for example by means of the flow sensor 5, switches to the second operating mode and performs the second closed-loop flow control, in particular based on the fluid pressures detected by the second pressure sensor 9 and the third pressure sensor 21 and preferably the degree of opening of the valve member 4.

What is claimed is:

1. A flow controller comprising a valve unit for influencing the flow of a fluid through a fluid channel, a flow sensor for detecting the flow of the fluid through the fluid channel, a pressure sensor arrangement for detecting a fluid pressure of the fluid, and a control unit adapted to, in response to the flow being within a measurement range of the flow sensor, assume a first operating mode and, in the first operating mode, to perform a first closed-loop flow control on the basis of the flow detected by the flow sensor, and, in response to the flow being outside the measurement range of the flow sensor, assume a second operating mode and, in the second operating mode, to perform an open-loop flow control on the basis of the detected fluid pressure and/or in the second operating mode, to perform a second closed-loop flow control on the basis of the detected fluid pressure, wherein the control unit is adapted to provide a continuous transition between the first closed-loop flow control in the first operating mode and the second closed-loop flow control in the second operating mode, and/or between the first closed-loop flow control in the first operating mode and the open-loop flow control in the second operating mode, and wherein the control unit is adapted to calculate the flow in the first operating mode on the basis of the detected fluid pressure and to determine an error of the calculated flow on the basis of the flow detected with the flow sensor.

2. The flow controller according to claim 1, wherein the control unit is configured to calculate the flow of the fluid in the second operating mode based on the detected fluid pressure and to perform the second closed-loop flow control based on the calculated flow and/or perform the open-loop flow control based on the calculated flow.

3. The flow controller according to claim 1, wherein the control unit is adapted, in the second operating mode, to perform the open-loop flow control not on the basis of the flow detected with the flow sensor and/or to perform the second closed-loop flow control not on the basis of the flow detected with the flow sensor.

4. The flow controller according to claim 1, wherein the pressure sensor arrangement comprises a first pressure sensor for detecting a first fluid pressure, the first pressure sensor being arranged upstream of the valve unit in the flow direction, and a second pressure sensor for detecting a second fluid pressure, the second pressure sensor being arranged downstream of the valve unit in the flow direction, and the control unit is adapted to perform, in the second operating mode, the open-loop flow control on the basis of the first fluid pressure and the second fluid pressure, or to perform the second closed-loop flow control on the basis of the first fluid pressure and the second fluid pressure.

5. The flow controller according to claim 1, wherein the control unit is adapted to perform, in the second operating mode, the open-loop flow control taking into account a flow characteristic of the valve unit, or to perform the second closed-loop flow control taking into account the flow characteristic of the valve unit.

6. The flow controller according to claim 5, wherein the valve unit comprises a valve member for influencing the flow of the fluid and the control unit is adapted to detect a degree of opening of the valve member and to determine the flow characteristic based on the degree of opening.

7. The flow controller according to claim 1, wherein the control unit is adapted to take the determined error into account in the second operating mode.

8. The flow controller according to claim 1, wherein the flow sensor is unidirectional, so that the measurement range comprises only a first flow direction of the fluid, and the control unit is adapted to assume the second operating mode in response to the fluid flowing in a second flow direction opposite to the first flow direction.

9. The flow controller according to claim 1, wherein the flow sensor is a thermal flow sensor.

10. The flow controller according to claim 1, wherein the pressure sensor arrangement is adapted to detect two fluid pressures of the fluid, and the control unit is adapted to carry out the open-loop flow control and/or the second closed-loop flow control in the second operating mode on the basis of the two detected fluid pressures and a conductance value of the valve unit.

11. The flow controller according to claim 10, wherein the conductance value is dependent on a valve opening.

12. A valve arrangement comprising a flow controller according to claim 1, a carrier section, and a plurality of valve modules disposed on the carrier section, wherein one of the valve modules comprises the valve unit.

13. The valve arrangement according to claim 12, wherein the fluid channel comprises a channel section arranged in the carrier section, via which channel section the fluid flows from and/or to the valve modules, and wherein the pressure sensor arrangement comprises a carrier section pressure sensor arranged in the carrier section, with which the control unit detects the fluid pressure.

14. The flow controller according to claim 1, wherein, the control unit is adapted to provide the continuous transition such that there is no jump in the actual flow of the fluid between the first closed-loop flow control in the first operating mode and the second closed-loop flow control in the second operating mode, and/or between the first closed-loop flow control in the first operating mode and the open-loop flow control in the second operating mode.

15. The flow controller according to claim 1, wherein the control unit is adapted to output a control signal for controlling the valve unit and to provide the continuous transition by changing the control signal during the continuous transition only continuously and/or only within predetermined limits.

16. The flow controller according to claim 1, wherein the control unit is adapted to output a control signal for controlling the valve unit and to limit the maximum change in the control signal when switching between the first operating mode and the second operating mode.

17. A method of operating a flow controller, the flow controller comprising a valve unit for influencing the flow of a fluid through a fluid channel, a flow sensor for detecting the flow of the fluid through the fluid channel, a pressure sensor arrangement for detecting a fluid pressure of the fluid, and a control unit adapted to, in response to the flow being within a measurement range of the flow sensor, assume a first operating mode and, in the first operating mode, to perform a first closed-loop flow control on the basis of the flow detected by the flow sensor, and, in response to the flow being outside the measurement range of the flow sensor, assume a second operating mode and, in the second operating mode, to perform an open-loop flow control on the basis of the detected fluid pressure and/or in the second operating mode, to perform a second closed-loop flow control on the basis of the detected fluid pressure, the method comprising the steps:

in response to the flow being within the measurement range of the flow sensor, entering the first operating mode, and performing the first closed-loop flow control based on the flow detected by the flow sensor in the first operating mode;

calculating the flow in the first operating mode on the basis of the detected fluid pressure and determining an error of the calculated flow on the basis of the flow detected with the flow sensor; and in response to the flow being outside the measurement range of the flow sensor, entering the second operating mode and performing the open-loop flow control and/or the second closed-loop flow control based on the detected fluid pressure in the second operating mode by taking the determined error into account.

18. The method according to claim 17, wherein, in the second operating mode, a calculated flow is calculated based on the detected fluid pressure and the open-loop flow control and/or the second closed-loop flow control is performed based on the calculated flow, wherein the calculated flow is calculated taking into account the determined error in such a way that the determined error is compensated.

19. A flow controller comprising a valve unit for influencing the flow of a fluid through a fluid channel, a flow sensor for detecting the flow of the fluid through the fluid channel, a pressure sensor arrangement for detecting a fluid pressure of the fluid, and a control unit adapted to, in response to the flow being within a measurement range of the flow sensor, assume a first operating mode and, in the first operating mode, to perform a first closed-loop flow control on the basis of the flow detected by the flow sensor, and, in response to the flow being outside the measurement range of the flow sensor, assume a second operating mode and, in the second operating mode, to perform an open-loop flow control on the basis of the detected fluid pressure and/or in the second operating mode, to perform a second closed-loop flow control on the basis of the detected fluid pressure, wherein the flow sensor is unidirectional, so that the measurement range comprises only a first flow direction of the fluid, and the control unit is adapted to assume the second operating mode in response to the fluid flowing in a second flow direction opposite to the first flow direction.

* * * * *